Figure 4:
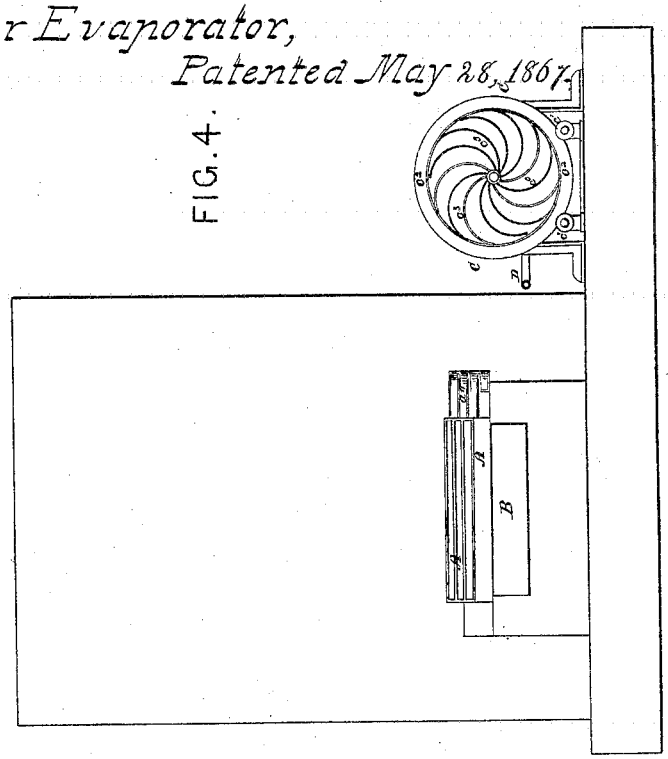

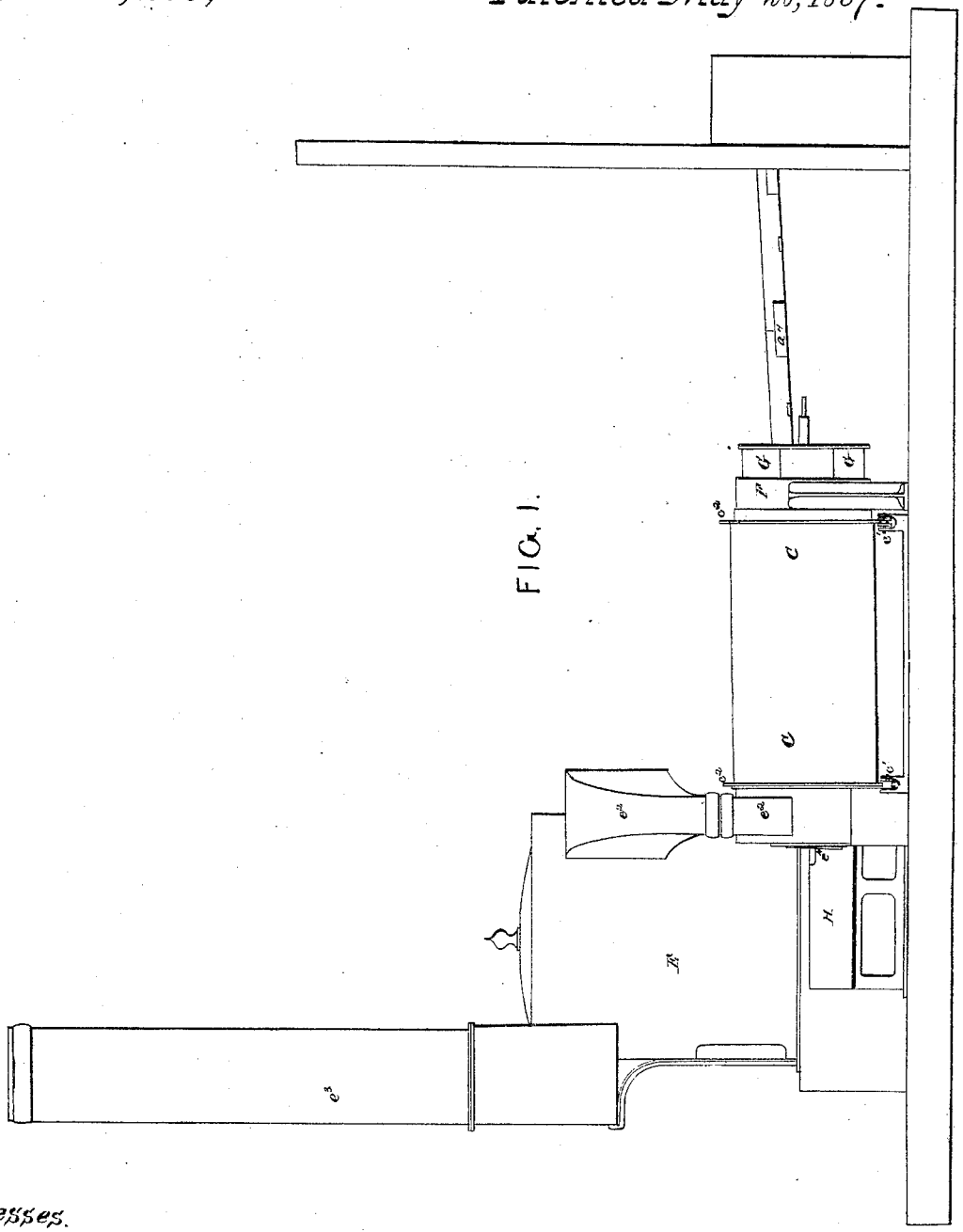

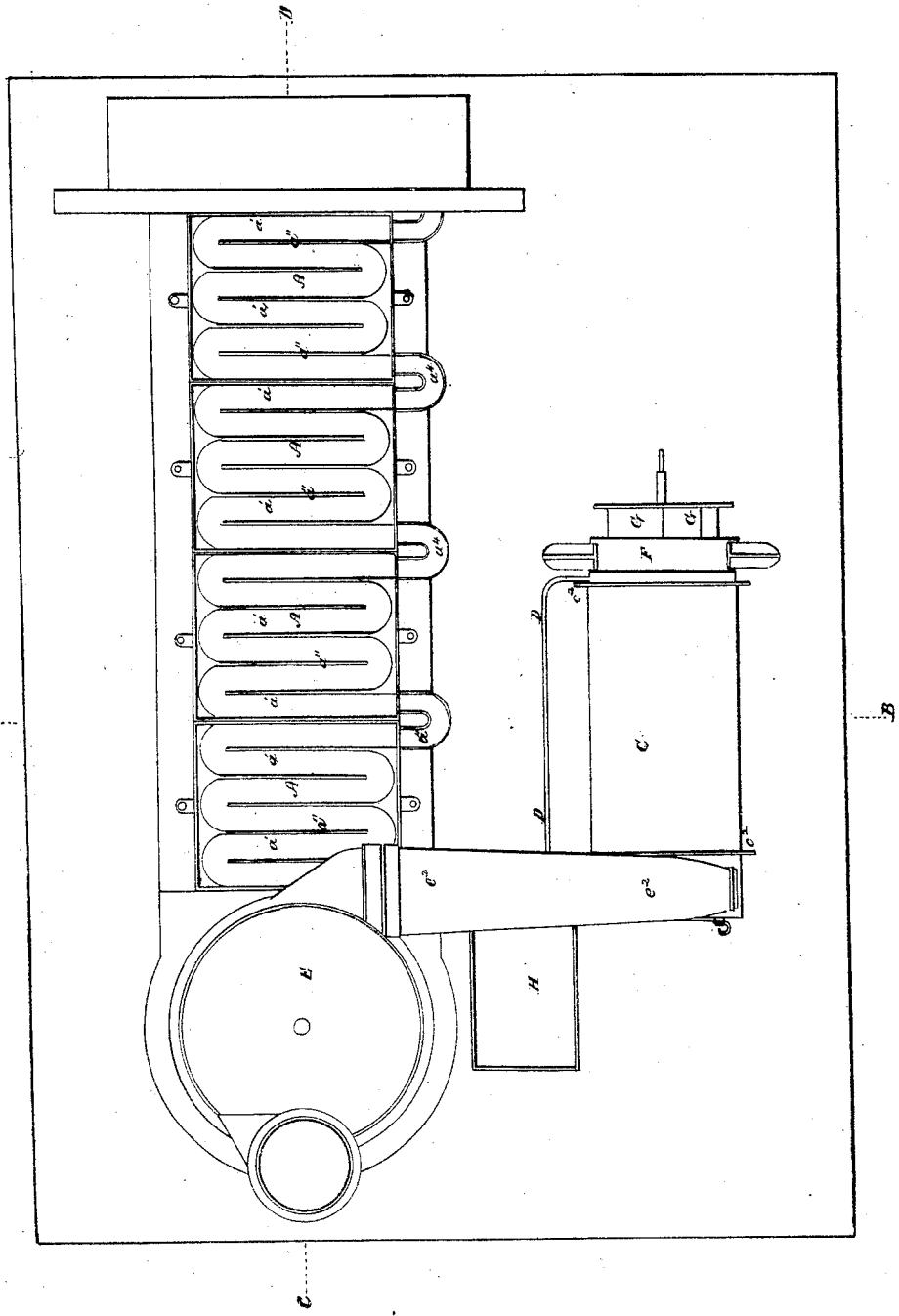

A. Fryer,
Sugar Evaporator,
No. 65,205. Patented May 28, 1867.

Witnesses.

Inventor.
Alfred Fryer
per D. Renwick
Attorney

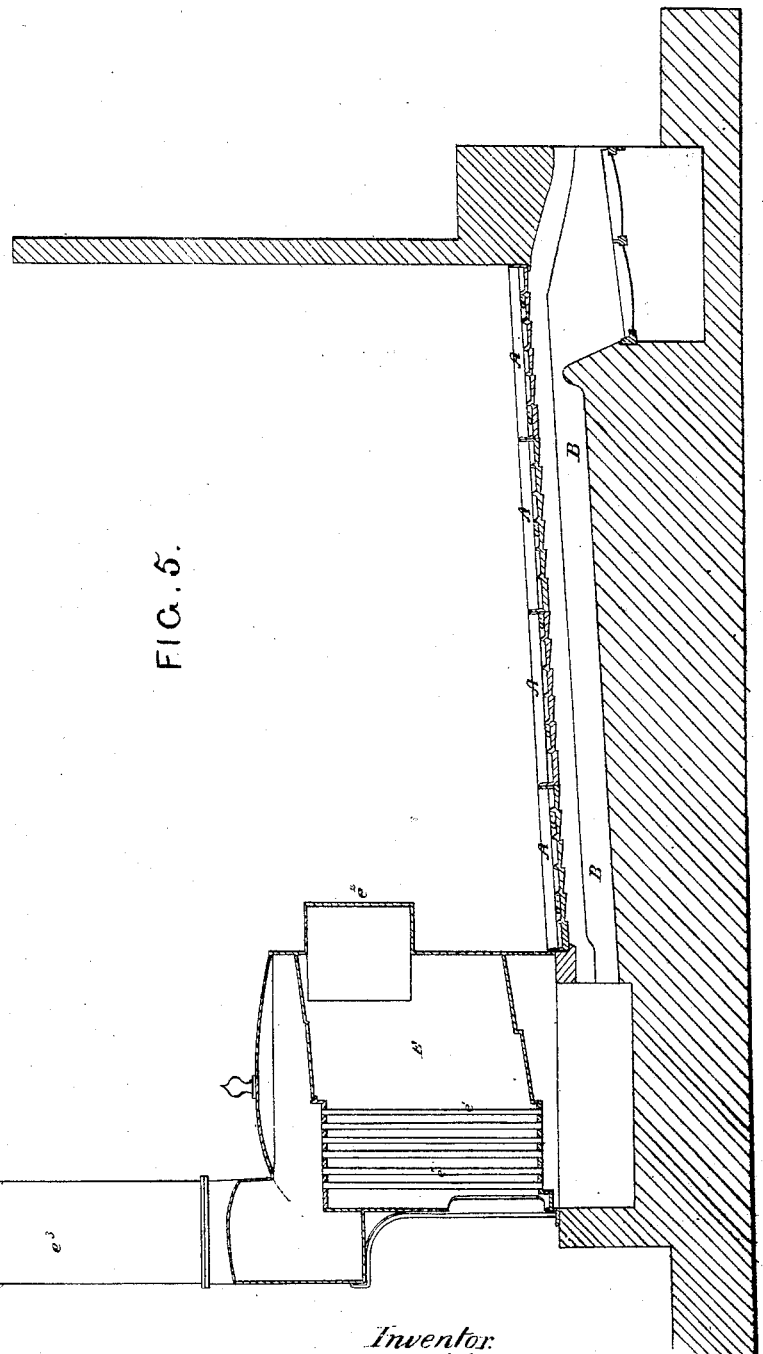

United States Patent Office.

ALFRED FRYER, OF MANCHESTER, ENGLAND.

Letters Patent No. 65,205, dated May 28, 1867.

IMPROVED APPARATUS FOR EVAPORATING AND CONCENTRATING CANE JUICE AND OTHER LIQUIDS.

*The Schedule referred to in these Letters Patent and making part of the same.*

TO ALL WHOM IT MAY CONCERN:

Be it known that I, ALFRED FRYER, of the city of Manchester, England, sugar refiner, have invented or discovered certain "Improvements in the Mode of Treating, for Evaporating and Concentrating Purposes, Cane Juice and Saccharine and other Solutions and Liquids," and also in machinery or apparatus for the concentration of cane juice and saccharine and other solutions, and for the evaporation of liquids; and I do hereby declare that the following is a full, true, and exact description thereof, reference being had to the accompanying drawings, and to the letters and figures marked thereon; that is to say:

For the sake of clearness, I will describe, first, my improvements in apparatus for the concentration of cane juice and saccharine and other solutions, and for the evaporation of liquids; and, second, my improved mode of treating cane juice and saccharine and other solutions and liquids; and also, for the sake of clearness, I will only refer to cane or beet-root juice as the material treated, it being understood that my apparatus and mode of treatment are applicable to the evaporation or concentration of other more or less liquid bodies.

Over a furnace I set, at a slight incline, a shallow vessel, made in parts, which, for the sake of convenience in hereafter describing the same, I call trays. These trays are joined together to form one vessel, either by channels projecting outwards from the bottom end of one tray and returning into the top end of the next, or in other convenient way. These trays have transverse grooves or corrugations, and stop or baffle-plates, forming channels, so as to cause the juice to traverse from side to side, in its progress from the top to the bottom end of the vessel. A good proportion for this vessel is to make its length about six times its width. I use also a revolving cylinder, which, for the sake of convenience, I place at the side of the corrugated vessel, and at a slightly lower level, so that the juice may flow from the corrugated vessel into the cylinder without having to be pumped. This cylinder is provided with a central shaft, on which a series of spiral blades is fixed. At each end of the cylinder there is a concentric ring, or flange, projecting inwards, which enables the cylinder to contain a certain quantity of juice. The cylinder is placed at a slight incline from the entrance to the exit end. I drive or draw heated air through the inside of this cylinder. For the purpose of economizing fuel, I use, for heating this air, the waste heat of the furnace, in manner well known; that is to say, I pass the products of combustion, on the way from the furnace to the chimney, through a number of pipes, between which the air is forced or drawn before entering the cylinder. The cylinder may, if found more convenient, be placed in some other position than that before mentioned; and if thought desirable, the vapor from the shallow corrugated vessel or trays may, by covering the trays, and other suitable arrangements, be conducted around the outside of it for the further economy of the heat.

Figure 3:
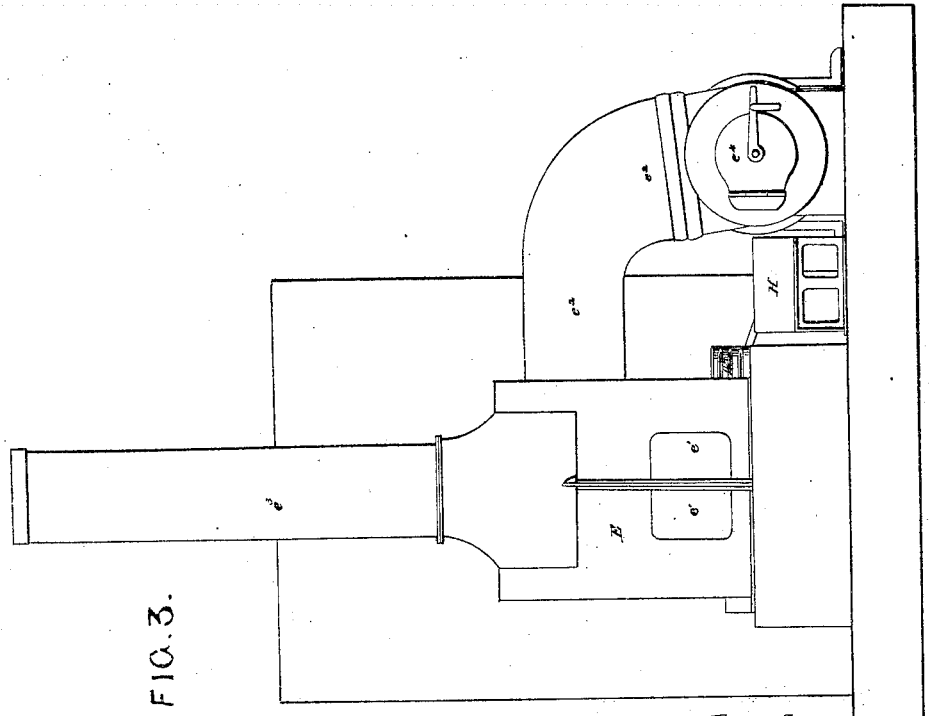

Figure 1 of the accompanying drawings is a side elevation, showing my apparatus.
Figure 2 is a plan.
Figure 3 is an end elevation.
Figure 4 is a cross-section on the line A B of fig. 2.
Figure 5 is a longitudinal section on the line C D of fig. 2.

A A are the trays. B is the furnace flue, carried underneath the trays. Each of the trays A has a series of curved corrugated channels $a^1 a^1$. These corrugations are too small to be shown on the small scale of the drawings. Ribs $a^2 a^2$ extend from one side to near the opposite side, as shown in the drawings, and make the channels continuous from end to end of each tray. An incline is made from one series of channels to the next; this incline is too slight to be shown on the small scale of the drawing. At the turns of the channel, the corners are filled up by sloping corner-pieces $a^3 a^3$. The trays are connected, to form one continuous vessel, by open elbow channels $a^4 a^4$.

C is the revolving cylinder, which is made of sheet metal, and to each end of which is fastened a cast-iron concentric ring $c^2$. The inner periphery of these concentric rings is smaller in diameter than the shell of the revolving cylinder, so as to enable the cylinder to hold a certain quantity of juice. The cylinder is supported upon anti-friction rollers $c^1 c^1$. It may be made to revolve either by a toothed pinion, working into a toothed wheel fixed on one of the concentric rings $c^2$, or in any other convenient way. As usually arranged, a small engine is put down to drive this cylinder, and also the fan G. The cylinder usually makes about two and one-half revolutions, and the fan about six hundred or six hundred and fifty revolutions per minute. I prefer to make the cylinder deliver the juice it contains, when sufficiently concentrated, by means of a pocket or pockets fixed on the inside of the shell of the revolving cylinder, at the liquor-outlet end. These pockets, revolving with the cylinder, take up a certain quantity of the concentrated juice at each revolution, and discharge it, if desired, into a chute, which is so arranged as to catch the concentrated juice as it falls from the pockets, and deliver it outside the apparatus, in a state ready for cooling into what I term "Fryer's Concrete." If at any time the liquor issuing from the cylinder is found not to be sufficiently concentrated, the supply of liquor flowing into the cylinder can be temporarily stopped, and the chute pushed on one side, thus keeping the liquor in the cylinder and exposed to the heated air until the desired degree of concentration is obtained. Though I prefer the plan of delivery described above, yet other methods of discharging the juice from the cylinder may be used, if found more convenient. The cylinder is slightly inclined towards the liquor-outlet end, to assist the flow of the material thereto. $c^3$ $c^3$ are sets of spiral blades placed in the cylinder C. Each of the sets of spiral blades is composed of thin metal plates, pierced with holes. The number of blades in each set varies from three upwards; those shown in the drawings have six blades to each set. They are fixed at their inner ends to a central tube or boss, while, by their spring-like action, the outer ends press against the cylinder. The tubes carrying the blades are fastened upon a central shaft, which is attached to the outer shell by means of arms. When the number of blades in each set varies, the set with the smallest number of blades is fixed nearest the concrete outlet, and the number of blades in each set is gradually increased toward the liquor-inlet end. Stays are used for part of the extent of the blades, to keep them in their determined spiral form. Instead of these spiral blades, other apparatus for attaining the same end may be adopted, if found more convenient; that is to say, the spiral blades may be replaced by other apparatus suitable for exposing a large surface of the liquor to be acted upon to the action of the heated air.

H is a cistern for receiving the juice from the trays A A. The juice, in passing into the cistern, first falls into a small vessel, from which it flows over into the cistern. This vessel contains a saccharometer, so that the density of the juice is under constant inspection. From the cistern H the juice flows in a stream, which may be increased or diminished at pleasure, through the pipe D into the cylinder C. E is an air-heating apparatus, formed of a casing containing a series of tubes $e^1$, situated to give passage to the products of combustion from the furnace, after passing through the flue under the trays and before entering the chimney $e^3$. Air is admitted to circulate between and among the pipes, and thus becomes heated before entering the cylinder C through the fixed pipe $e^2$. I do not confine myself to the means just described for heating the air previous to its admission into the cylinder, as other means may be adopted. $e^4$ is a man-hole, giving access to the pipe $e^2$. F is a fixed metal connecting-piece, at the air-exit end of the cylinder; and G is a fan for exhausting the heated air through the cylinder C. I do not, however, confine myself to this means of causing a current of heated air to flow through the cylinder C, as a steam jet or other convenient apparatus may be used for this purpose.

My improved mode of treating cane or beet-root juice is to cause the juice to flow first in a continuous stream into the shallow corrugated tray hereinbefore described, entering at the furnace end, and along the channels of which it travels until it reaches the outlet therefrom. By this means the juice is exposed to the greatest heat when it is in the least concentrated state, and as it by degrees flows on in the channels, and passes further from the furnace end, it becomes more concentrated, while at the same time it is gradually exposed to a less degree of heat; thus the juice is subjected to a heated surface for a very small portion of time. Thus, by this apparatus for concentrating cane or beet-root juice, or other solutions liable to be injured by great and continued heat, concentration is effected without mischief to the substance operated upon. On flowing off from the shallow trays, the juice passes through a sieve, and thence into a tank or reservoir, whence it flows through a gauge-vessel in a continuous stream into the cylinder C, from which it issues in a more or less concentrated state. When cool, the mass, if sufficiently concentrated, solidifies and assumes a semi-crystalline or non-crystalline homogeneous form, to which, as before stated, I give the name of "Fryer's Concrete." The cylinder and its contents are heated by the heated air, driven or drawn through it in a dispersed and constantly changing current, and if it is thought desirable, the vapor from the shallow corrugated trays may be carried around the outside of the cylinder, so as to aid in heating it. The spiral blades, in revolving, take up portions of the juice; these portions, together with those upon the inside of the revolving cylinder, are thus fully exposed to the action of the heated air, the temperature of which is so immediately reduced by the evaporation it causes as to produce no prejudicial effects.

Having now described the nature of the said invention, and in what manner the same is to be performed, I declare that what I claim, and desire to secure by Letters Patent, is—

1. Treating cane juice and saccharine solutions and liquids, in order to obtain what I term "Fryer's Concrete," or sugar in a non-crystalline or semi-crystalline solid state, by exposing it or them to heat in shallow trays, and then to heat in a revolving cylinder, all substantially in manner herein set forth.

2. Treating solutions and liquids for evaporating and concentrating purposes, by exposing them to heat in shallow trays, and then to heat in a revolving cylinder, as herein set forth.

3. Treating cane juice and saccharine and other solutions and liquids, for evaporating and concentrating purposes, by passing it or them through or into a revolving cylinder, heated from the inside, and through the inside of which heated air is forced or driven.

4. The machinery or apparatus for the concentration of cane juice and saccharine and other solutions, and for the evaporation of liquids, consisting of shallow trays, in combination with revolving cylinders, all constructed and acting substantially in manner described.

In witness whereof I, the said ALFRED FRYER, have hereunto set my hand this eighteenth day of March, one thousand eight hundred and sixty-seven.

ALFRED FRYER.

Witnesses:
EDWARD BYTHWAY, 18 *Princess Street, Manchester, Gentleman.*
ROBERT E. CUNLIFFE, *Fern Hill, Pendleton Square, Manchester, Gentleman.*